(12) United States Patent
Bernard et al.

(10) Patent No.: US 9,217,480 B2
(45) Date of Patent: Dec. 22, 2015

(54) DISC BRAKE PAD

(71) Applicant: Robert Bosch GmbH, Stuttgart (DE)

(72) Inventors: Simon Bernard, Le Perreux s/Marne (FR); Sandra Merrien, Paris (FR); Roger Mahoudeaux, Le Blanc Mesnil (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/358,267

(22) PCT Filed: Dec. 6, 2012

(86) PCT No.: PCT/EP2012/074599
§ 371 (c)(1),
(2) Date: May 15, 2014

(87) PCT Pub. No.: WO2013/087493
PCT Pub. Date: Jun. 20, 2013

(65) Prior Publication Data
US 2014/0311839 A1    Oct. 23, 2014

(30) Foreign Application Priority Data
Dec. 15, 2011   (FR) ..................................... 11 03910

(51) Int. Cl.
*F16D 65/095* (2006.01)
*F16D 65/092* (2006.01)
*F16D 65/097* (2006.01)

(52) U.S. Cl.
CPC ............ *F16D 65/095* (2013.01); *F16D 65/092* (2013.01); *F16D 65/0972* (2013.01); *F16D 65/0973* (2013.01)

(58) Field of Classification Search
CPC .......... F16D 65/095; F16D 2065/1392; F16D 65/097; F16D 65/0972
See application file for complete search history.

(56) References Cited

U.S. PATENT DOCUMENTS

2010/0013448 A1* 1/2010 Motz ............................. 323/280
2014/0367208 A1* 12/2014 Miyake et al. ............... 188/72.3

FOREIGN PATENT DOCUMENTS

| DE | 196 50 592 A1 | 6/1998 |
| DE | 10 2009 006 285 A1 | 7/2010 |
| EP | 1 447 585 A2 | 8/2004 |
| JP | 57163736 | * 10/1982 |

OTHER PUBLICATIONS

International Search Report corresponding to PCT Application No. PCT/EP2012/074599, mailed Mar. 14, 2013 (French and English language document) (6 pages).

* cited by examiner

*Primary Examiner* — Vishal Sahni
(74) *Attorney, Agent, or Firm* — Maginot, Moore & Beck LLP

(57) ABSTRACT

A disc brake pad includes lugs, each of which is provided with a groove that receives the tongue of a coiled spring disposed in a housing in the brake yoke. The aforementioned groove has an essentially mixtilinear rectangular section, of which the base is formed in cross-section by a central portion in the form of a convex root face forming a support extending on each side into a fillet recessed from the supporting plane. The fillet joins the respective side of the groove behind the supporting plane.

6 Claims, 4 Drawing Sheets

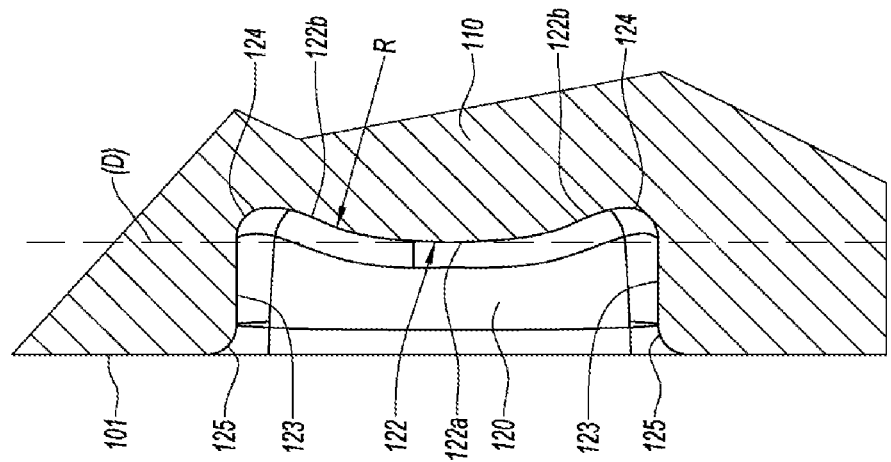
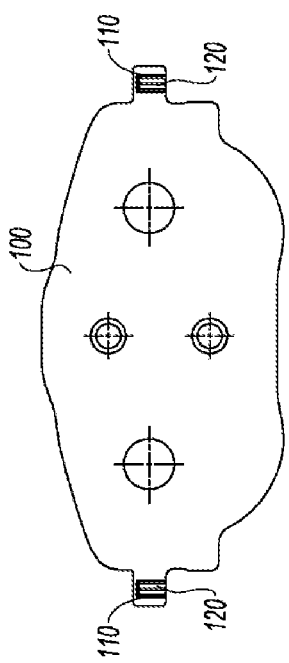
Fig. 4A
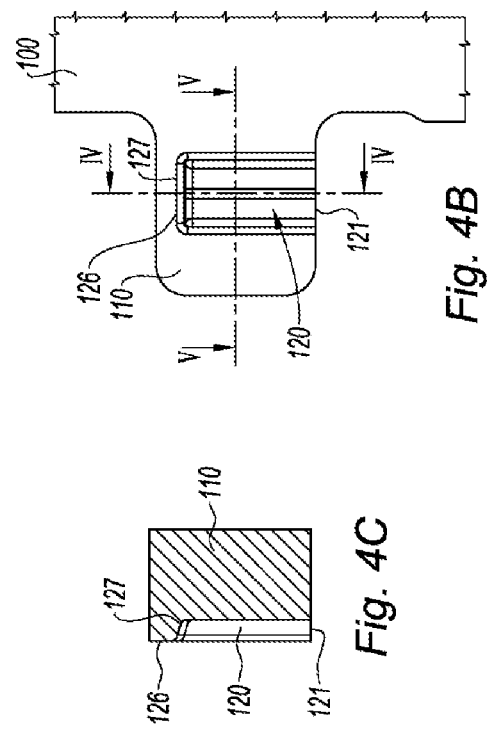
Fig. 4B
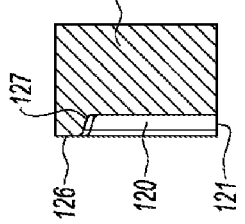
Fig. 4C
Fig. 5

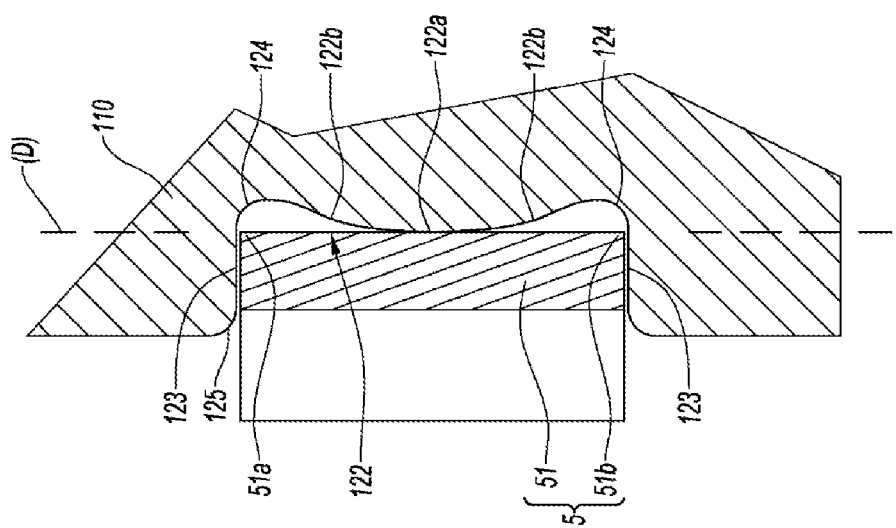
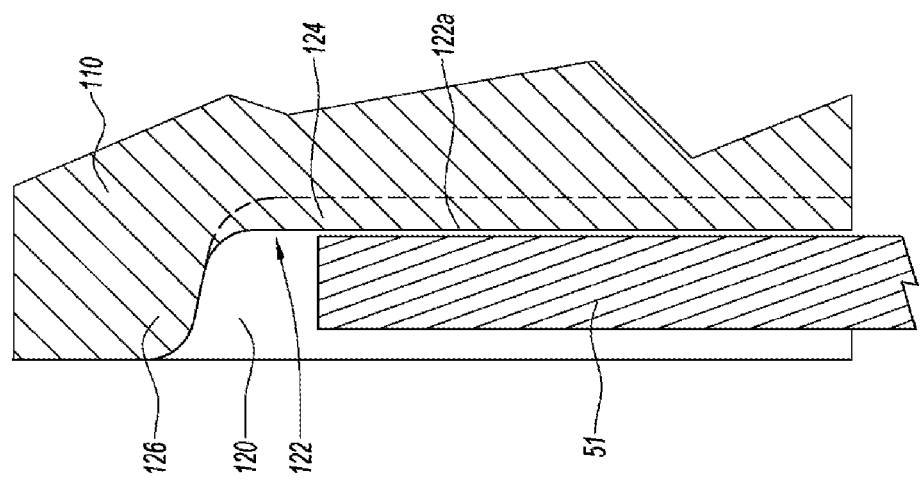
Fig. 6A
Fig. 6B

DISC BRAKE PAD

This application is a 35 U.S.C. §371 National Stage Application of PCT/EP2012/074599, filed on Dec. 6, 2012, which claims the benefit of priority to Serial. No. FR 1103910 filed on Dec. 15, 2011, in France, the disclosures of which are incorporated herein by reference in their entirety.

The present disclosure relates to a disk brake pad comprising lugs which are each provided with a groove which receives the tongue of a wound spring, moving into a housing in the brake cover.

To this end, the disclosure relates to a disk brake pad which comprises lugs which are each provided with a groove which receives a tongue of a wound spring or spring in the form of a helical spring in order to move into a housing of the brake disk cover, this brake pad being characterized in that the groove has a mixtilinear generally rectangular cross-section whose base is composed in cross-section of a protruding central portion which forms an abutment which is extended at each side by a fillet which is recessed from the abutment plane, the fillet joining the respective side of the groove behind the abutment plane.

As a result of the recessed position of the fillets which form the joint between the base of the groove and the sides thereof, the dimension of the groove in cross-section may be adapted closely to the cross-section of the tongue so as to block it in order to prevent it from tilting under the effect of the movements applied to the brake plate (in the direction of braking or that of release) positioning the helical spring obliquely and increasing the translation forces of the brake plate relative to the cover.

The quality of the movement thus permitted for the brake plate is a decisive element for the correct operation of the brake and in the reduction of wear of the brake plate and the consumption.

In a particularly advantageous manner, one end of the groove in the longitudinal direction of the groove is open and the other end is closed. This prevents any error in assembling the helical springs on the lugs of the plate since the groove of each lug is orientated in this manner owing to the fact that it is not open.

The groove allows the tongue of the helical spring to be received and held, which ensures the guiding of each lug in the housing of the brake cover without any risk of tilting of the tongue and consequently of the spring.

BACKGROUND

There is already known a disk brake pad of the type defined above, illustrated in FIG. 1 which generally shows a brake disk 1 which is overlapped by a cover 2 which is composed of two arms 20 which are connected by means of two bridge-like members 21. These two arms 20 in the form of a "U" extend from one side and the other of the disk 1 and each carry a brake pad. The brake pads 3 are provided at the ends thereof with lugs 31 for assembly thereof in the housings 22 of each arm, via a guiding spring 4 with which each housing 22 is provided and which cooperates with the lug 31 of the pad which is itself provided with an auxiliary spring 5 in accordance with the prior art.

The lugs 31 at the two ends of the pad 3 slide axially in the guiding members 4 and are held by the spring 5, that is to say, perpendicularly relative to the plane of FIG. 1.

The function of the guiding members 4 is to guide the pad for the braking and its return into the position not in contact with the brake disk 1 and to damp the impact of the lugs 31 against the base of each housing 22 when the pads 3 are driven by the disk 1 during a braking phase.

According to FIGS. 2A, 2B, 2C, the known brake pad 3 comprises in the lugs 31 thereof two grooves 10, each for receiving a spring 5 known as a "helical spring" owing to its shape wound into a helix terminating in a fixing tongue 51. This spring 5 is engaged with the tongue 51 thereof in the groove 10 and the pad 3 equipped in this manner is then slid into the housings 22 (FIG. 1).

FIG. 2B is an enlarged view of a lug 31 which shows the groove 10. FIG. 2C is a sectioned view along II-II of FIG. 2B showing the cross-section of the groove 10. FIG. 3 is an enlarged sectioned view along III-III of FIG. 2 showing more specifically the shape of the groove 10 which has a generally rectangular cross-section with a base 11 and two sides 12, 13 which are connected to the base by means of fillets 14, 15. The inlet of the groove 10 in the face 32 of the lug is also bordered by fillets 16, 17.

The tongue 51 of the helical spring 5 is illustrated in cross-section in a state installed in the groove 10.

This tongue 51 abuts via the corners 51a, 51b thereof against the fillets 14, 15 of the groove so that the positioning of this tongue 51 and consequently that of the spring 5 and the pad 3 are not stable. The tongue 51 can tilt and be placed in the position illustrated with broken lines.

The tongue 51 can abut against the base 11 of the groove 10 only if the width thereof is sufficiently reduced so that the corners 51a, 51b thereof do not extend as far as the fillets 14 and/or 15. In this case, however, the tongue 51 floats in the groove 10 and can slide transversely and nonetheless risks moving into abutment via a corner 51a or 51b against the fillet 14, 15 or against the side 12, 13 of the groove.

Generally, the retention of the spring 5 on the lug 31 is not stable and creates a floating action in respect of the retention of the brake pad 3 in the housings 22 (FIG. 1).

An object of the present disclosure is to develop a disk brake plate which allows the rotation of the radial spring to be reduced after mounting the groove and allows an error in assembling an inappropriate radial spring to be prevented.

SUMMARY

To this end, the present disclosure relates to a brake pad, characterized in that one end of the groove in the longitudinal direction is open and the other end is closed.

BRIEF DESCRIPTION OF THE DRAWINGS

The present disclosure will be described below with reference to an embodiment of a disk brake plate according to the disclosure illustrated in the appended drawings, in which:

FIG. 4A is a plan view of a brake pad according to the disclosure, FIG. 4B is a view drawn to an enlarged scale of a lug of the brake pad of FIG. 4A, FIG. 4C is a sectioned view along IV-IV of the lug of the pad of FIG. 4B, FIG. 5 is a section along V-V of FIG. 4B drawn to a greatly enlarged scale, FIG. 6A is a sectioned view drawn to a greatly enlarged scale corresponding to FIG. 4C illustrating the positioning of the tongue of the spring in the groove of the brake pad according to the disclosure, FIG. 6B is a sectioned view similar to that of FIG. 5 illustrating the positioning of the tongue of a helical spring in the groove of the brake pad according to the disclosure.

DETAILED DESCRIPTION

Figure 1:
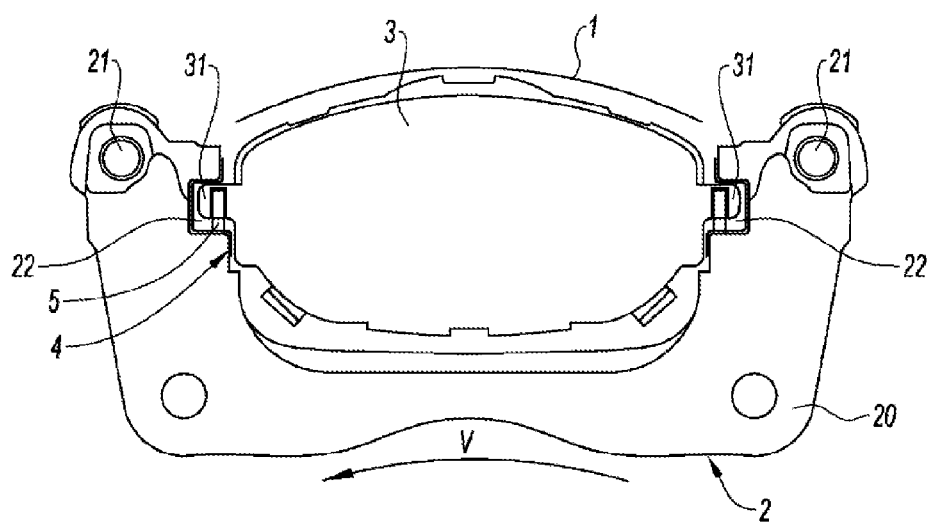
FIG. 1 is a side view of a disk brake cover which is provided with two guiding members and a brake pad according to the prior art.
Figure 3:
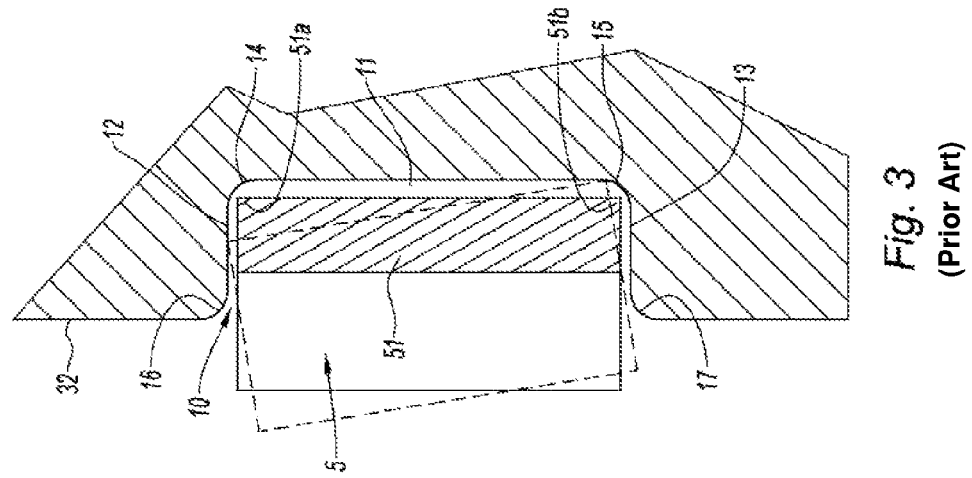
FIG. 3 is a cross-section drawn to a greatly enlarged scale of the lug 31 of the pad of FIG. 2B along the line of section III-III.
Figure 2A:
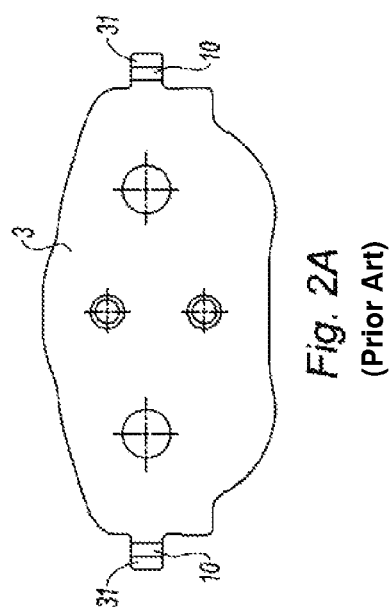
FIG. 2A is a plan view of a known brake pad.
Figure 2B:
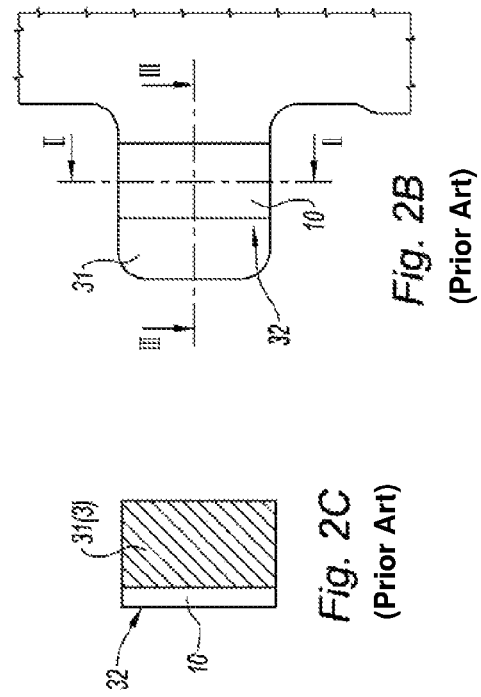
FIG. 2B is a detailed view drawn to an enlarged scale of a lug of the brake pad of FIG. 2A.
Figure 2C:
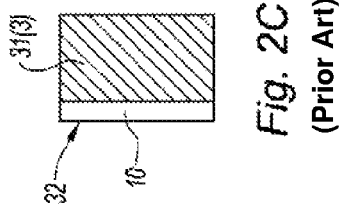
FIG. 2C is a sectioned view along II-II of FIG. 2B.

According to FIGS. 4A, B, C and 5, the disclosure relates to a brake pad 100 whose lugs 110 comprise a groove 120 for receiving the tongue 51 of a helical spring 5 which serves to install the brake pad 100 in a respective housing 122 (FIG. 1) of a brake.

As shown in FIG. 4C, and most particularly the greatly enlarged view of FIG. 5, the groove 120, the inlet 121 of which is located at the lower side of the plate (taking the orientation of FIG. 4A), has in cross-section a mixtilinear generally rectangular shape which is formed by a base 122 whose central portion 122a is constituted by a flat portion having a large radius of curvature which is extended with a zone in the form of a circular arc 122b having a radius R at each side to join a fillet 124 which is connected to each of the sides 123. The sides 123 open at the outer face 101 of the lug 110 of the pad with a fillet 125.

The straight line (D) which indicates an abutment plane which extends via the flat portion 122a between the circle segments 122b intersects the lateral walls 123 beyond the fillets 124, that is to say, it practically intersects the straight segment of each of the walls 123 beyond the curvature of the fillets 124. The straight line (D) illustrates in cross-section the abutment plane of the tongue 51 against the base 122 of the groove 110. The curved portions 122b are recessed with respect to this straight line (D) or abutment plane. The same applies to the fillets 124 which join their respective side 123 practically only behind the straight line (D). In this manner, the contour formed by the straight line (D) and the sides 123 is constituted by rectilinear segments which constitute the housing of the tongue 51.

It should be noted that the walls 123 may be slightly open towards the face 101 of the pad.

FIGS. 4B, 4C show that, depending on the orientation of the plate of FIG. 4A, the groove 120 opens only at the lower portion 121 and the upper portion 126 thereof is closed, preferably being bordered by a fillet 127 which is the continuation of the lateral fillet 124, that is to say, always recessed relative to the geometric surface of the base of the groove which is indicated by the straight line D in FIG. 5.

In summary, in the groove 120 of the brake pad according to the disclosure, the base 122 is bordered at the sides and at the upper portion thereof by a fillet 124, which is generally U-shaped and which is recessed relative to the surface of the flat portion 122a which protrudes to the greatest extent from the base 122, that is to say, the straight line (D) or the abutment plane.

FIGS. 6A, 6B schematically illustrate the positioning of the tongue 51 of the spring 5 which is engaged in the groove 120 of the lug 110.

FIG. 6A shows that the tongue 51 abuts against the flat portion 122a or tip of the base 122. The spring 5 grips the lug 31 at one side with the tongue 51 thereof and at the other side with the helical loop thereof, which is not illustrated, and is positioned by the tongue thereof being engaged in the groove, the other side of the lug 31 being smooth.

FIG. 6B shows how the tongue 51 is supported by the flat portion 122a of the base 120 and by the sides 125 without any risk of tilting. This is because, since the corners 51a, 51b of the tongue 51 are no longer in contact with the fillets, in this instance the fillets 124 which are recessed relative to the abutment surface of the tongue 51 which actually corresponds to the straight line D of FIG. 5, it is possible either to reduce the width of the groove 120 or to increase the width of the tongue 151 in order to minimize the free space in the transverse direction between the sides of the tongue 51 and the walls 123. This considerably improves the retention of the spring 5 in the groove 120 and thus improves the operation of the brake.

The disclosure is used in the field of disk brakes for motor vehicles and in particular for producing disk brake pads.

By way of example, the width of the groove 120 between the sides 123 is, for example, in the order of 3.5 mm and the width of the flat portion is in the order of 0.5 mm. The recess of the portions in the form of a circular arc 122b and the fillets 124 relative to the plane illustrated by the straight line (D) is in the order of 0.5 mm. The opening angle of the sides 123 is a maximum of 6°.

The invention claimed is:

1. A disk brake pad comprising:
    a plurality of lugs, each of which includes an outer face in which a groove is defined, the groove extending in a longitudinal direction generally parallel to the outer face, the groove being configured to receive a tongue of a wound spring that extends into a housing in a brake cover,
    wherein each lug of the plurality of lugs, in a plane perpendicular to the longitudinal direction, has a mixtilinear generally rectangular cross-section defining the groove, the groove being defined by a base including a protruding central portion forming an abutment and defining an abutment plane parallel to the outer face, the base extending from each side of the protruding central portion to a fillet, which is recessed from the abutment plane and connects the base to a respective side of the groove at a position behind the abutment plane relative to the outer face.

2. The brake pad as claimed in claim 1, wherein a first end of the groove in the longitudinal direction is an open end and a second opposite end is a closed end.

3. The brake pad as claimed in claim 1, wherein the protruding central portion protrudes in a direction towards the outer face.

4. The brake pad as claimed in claim 1, wherein each fillet is recessed from the abutment plane in a direction away from the outer face.

5. The brake pad as claimed in claim 1, further comprising:
    a generally planar brake plate defining a brake plate plane,
    wherein the outer face of each lug of the plurality of lugs is parallel to the brake plate plane.

6. The brake pad as claimed in claim 5, wherein:
    the generally planar brake plate comprises a first end and a second end, and
    a first lug of the plurality of lugs extends away from the first end and a second lug of the plurality of lugs extends away from the second end.

* * * * *